US012411888B2

(12) United States Patent
Motgi et al.

(10) Patent No.: US 12,411,888 B2
(45) Date of Patent: Sep. 9, 2025

(54) SYSTEM AND METHOD FOR MANAGING USER ACCESSIBILITY BASED ON DATA IN A DATA MANAGEMENT SYSTEM

(71) Applicant: Dell Products L.P., Round Rock, TX (US)

(72) Inventors: Prem Pradeep Motgi, Austin, TX (US); Dharmesh M. Patel, Round Rock, TX (US); Manpreet Singh Sokhi, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/458,408

(22) Filed: Aug. 30, 2023

(65) Prior Publication Data

US 2025/0077575 A1    Mar. 6, 2025

(51) Int. Cl.
*G06F 16/65* (2019.01)
*G06F 3/16* (2006.01)

(52) U.S. Cl.
CPC .............. *G06F 16/65* (2019.01); *G06F 3/167* (2013.01)

(58) Field of Classification Search
CPC .......... G06F 16/65; G06F 3/167; G06F 3/048; G06F 9/451; A61B 5/4803; A61B 5/00; G09B 21/00
See application file for complete search history.

(56) References Cited

U.S. PATENT DOCUMENTS

| 5,649,060 A | 7/1997 | Ellozy et al. |
| 6,606,620 B1 | 8/2003 | Sundaresan |
| 8,117,235 B1 | 2/2012 | Barta |
| 8,255,386 B1 | 8/2012 | Annau et al. |

(Continued)

FOREIGN PATENT DOCUMENTS

| CN | 202058147 U | 11/2011 |
| CN | 115292285 A | 11/2022 |

(Continued)

OTHER PUBLICATIONS

D. Fedasyuk and I. Lutsyk, "Tools for adaptation of a mobile application to the needs of users with cognitive impairments," 2021 IEEE 16th International Conference on Computer Sciences and Information Technologies (CSIT), LVIV, Ukraine, 2021, pp. 321-324 , doi: 10.1109/CSIT52700.2021.9648702. (Year: 2021).*

(Continued)

*Primary Examiner* — William P Bartlett
(74) *Attorney, Agent, or Firm* — WOMBLE BOND DICKINSON (US) LLP

(57) ABSTRACT

Methods and systems for managing user interactions between a user and at least one user device are disclosed. To manage user interactions, data management system may obtain an interaction model to deploy to the at least one user device in order to establish an interface. The interaction model may define how the at least one user device communicates information to the user and/or obtained user input from the user. To obtain the interaction model relevant to a user, data management system may identify at least one (Continued)

condition impacting an ability of the user to interact with the at least one user device and the extent of the condition limiting the user's ability to interact with the at least one user device.

20 Claims, 6 Drawing Sheets

(56) References Cited

U.S. PATENT DOCUMENTS

| | | | |
|---|---|---|---|
| 8,255,948 | B1 | 8/2012 | Black et al. |
| 8,335,688 | B2 | 12/2012 | Yegnanarayanan et al. |
| 8,412,521 | B2 | 4/2013 | Mathias et al. |
| 8,495,720 | B2 | 7/2013 | Counterman |
| 9,031,839 | B2 | 5/2015 | Thorsen et al. |
| 9,361,428 | B2 | 6/2016 | Bessette |
| 9,571,890 | B1 | 2/2017 | Diamondstein |
| 9,781,097 | B2 | 10/2017 | Grajek et al. |
| 10,042,993 | B2 | 8/2018 | Beigi |
| 10,073,948 | B2 | 9/2018 | Cohen et al. |
| 10,157,275 | B1 | 12/2018 | Venkatasamy et al. |
| 10,462,142 | B2 | 10/2019 | Pattar et al. |
| 10,701,056 | B2 | 6/2020 | Murthy |
| 10,896,681 | B2 | 1/2021 | Aleksic et al. |
| 10,904,237 | B2 | 1/2021 | Murthy et al. |
| 11,010,392 | B1 | 5/2021 | Hirsch et al. |
| 11,094,402 | B2 | 8/2021 | Brown et al. |
| 11,217,331 | B2 | 1/2022 | Vishnubhatla et al. |
| 11,405,189 | B1 | 8/2022 | Bennison |
| 11,631,401 | B1* | 4/2023 | Nudd ............... G16H 80/00 704/9 |
| 11,763,821 | B1* | 9/2023 | McNair ............ G10L 15/30 704/270.1 |
| 11,849,069 | B1* | 12/2023 | Can ................. G06F 40/30 |
| 12,135,708 | B2 | 11/2024 | Chermside |
| 2003/0046401 | A1* | 3/2003 | Abbott .............. G06F 9/451 709/227 |
| 2005/0160166 | A1 | 7/2005 | Kraenzel |
| 2008/0154961 | A1 | 6/2008 | Dougall |
| 2008/0275701 | A1 | 11/2008 | Wu et al. |
| 2009/0171692 | A1* | 7/2009 | Zilberman ......... G16H 10/60 715/745 |
| 2010/0169304 | A1 | 7/2010 | Hendricksen et al. |
| 2011/0131174 | A1 | 6/2011 | Birch et al. |
| 2012/0265771 | A1 | 10/2012 | Suh |
| 2014/0181673 | A1* | 6/2014 | Work ................ G06F 3/0484 715/729 |
| 2014/0201199 | A1 | 7/2014 | Hajaj |
| 2014/0207885 | A1 | 7/2014 | Baker et al. |
| 2014/0344288 | A1 | 11/2014 | Evans |
| 2015/0169574 | A1 | 6/2015 | Bau et al. |
| 2015/0199268 | A1 | 7/2015 | Davis et al. |
| 2015/0356127 | A1 | 12/2015 | Pierre et al. |
| 2016/0006839 | A1 | 1/2016 | Sawazaki |
| 2016/0164813 | A1* | 6/2016 | Anderson ......... H04L 51/046 709/206 |
| 2016/0231928 | A1 | 8/2016 | Lewis et al. |
| 2016/0232159 | A1 | 8/2016 | Parikh |
| 2016/0306812 | A1 | 10/2016 | McHenry et al. |
| 2016/0378760 | A1 | 12/2016 | Braz |
| 2017/0013047 | A1 | 1/2017 | Hubbard |
| 2017/0262164 | A1* | 9/2017 | Jain ................. G06F 3/04847 |
| 2017/0365101 | A1* | 12/2017 | Samec .............. G06T 19/006 |
| 2018/0024845 | A1* | 1/2018 | Card ................ G06F 3/167 715/719 |
| 2018/0121502 | A1 | 5/2018 | Prieur |
| 2018/0189352 | A1* | 7/2018 | Ghafourifar ........ G06F 9/451 |
| 2018/0203612 | A1 | 7/2018 | Kats et al. |
| 2019/0012931 | A1* | 1/2019 | Candelore ......... H04N 21/4532 |
| 2019/0279744 | A1 | 9/2019 | Howley et al. |
| 2019/0297035 | A1 | 9/2019 | Fox et al. |
| 2019/0325036 | A1 | 10/2019 | Edge |
| 2020/0110882 | A1 | 4/2020 | Ripolles Mateu et al. |
| 2020/0226216 | A1 | 7/2020 | Marin et al. |
| 2020/0258516 | A1* | 8/2020 | Khaleghi ............ G10L 25/66 |
| 2021/0056131 | A1 | 2/2021 | Ackermann et al. |
| 2021/0065203 | A1 | 3/2021 | Billigmeier et al. |
| 2021/0256534 | A1 | 8/2021 | An |
| 2021/0390196 | A1 | 12/2021 | Lavine et al. |
| 2022/0027859 | A1 | 1/2022 | Daga |
| 2022/0261152 | A1 | 8/2022 | Jude et al. |
| 2022/0293087 | A1 | 9/2022 | Kumar |
| 2022/0334719 | A1 | 10/2022 | Thrane |
| 2022/0366131 | A1* | 11/2022 | Ekron ............... G06F 16/986 |
| 2023/0058470 | A1 | 2/2023 | Chandrashekar et al. |
| 2023/0061725 | A1 | 3/2023 | Khan |
| 2023/0068099 | A1* | 3/2023 | Abramenko ....... G10L 21/0364 |
| 2023/0137931 | A1 | 5/2023 | Song |
| 2023/0221911 | A1* | 7/2023 | Bandameedipalli ...... G06F 3/14 345/156 |
| 2024/0112597 | A1* | 4/2024 | Kim ................. G09B 21/004 |
| 2024/0248592 | A1* | 7/2024 | Zerhusen ........... G06F 3/0481 |

FOREIGN PATENT DOCUMENTS

| | | |
|---|---|---|
| JP | 4808173 B2 | 11/2011 |
| JP | 2015-106406 A | 6/2015 |
| WO | 2023/220948 A1 | 11/2023 |

OTHER PUBLICATIONS

Balaskas, Georgios, et al., "An end-to-end system for transcription, translation, and summarization to support the co-creation process. A Health Cascade Study", ACM Petra '23, published Aug. 10, 2023, pp. 625-631. (Year: 2023) (7 Pages).

"FollowMyHealth®," Allscripts Healthcare Solutions Inc, Google Play Store, Web Page <https://play.google.com/store/apps/details?id=com.jardogs.fmhmobile&hl=en_US&gl=US> accesed on Jan. 8, 2023 (4 Pages).

Page, Sébastien, "How to move your Health data from one iPhone to another," iDB, Web Page <https://www.idownloadblog.com/2016/10/13/health-data-importer-makes-moving-your-health-data-from-one-iphone-to-another-a-breeze/> accessed on Oct. 30, 2022 (9 Pages).

"MyChart," Web Page <https://www.mychart.org/> accessed on Oct. 30, 2022 (6 Pages).

Xu, Jie et al., "Federated learning for healthcare informatics," Journal of Healthcare Informatics Research 5 (2021): 1-19. (19 Pages).

Naz, Sadaf et al., "A comprehensive review of federated learning for COVID-19 detection," International Journal of Intelligent Systems 37.3 (2022):2371-2392. (22 Pages).

Prasser, Fabian, et al., "Efficient and effective pruning strategies for health data de-identification," BMC medical informatics and decision making 16.1 (2016): 1-14. (14 Pages).

"Speech Recognition," Web Accessibility Initiative. Web Page <https://www.w3.org/WAI/perspective-videos/voice/> accessed on Aug. 30, 2023 (6 Pages).

"Text Size," Web Accessibility Initiative. Web Page <https://www.w3.org/WAI/GL/low-vision-a11y-tf/wiki/Text_Size> accessed on Aug. 30, 2023 (5 Pages).

Mesko, Bertlan, "The Top 10 Health Chatbots," The Medical Futurist, Aug. 1, 2023, Web Page <https://medicalfuturist.com/top-10-health-chatbots/> accessed on Aug. 30, 2023 (11 Pages).

Longoni, Chiara et al., "AI Can Outperform Doctors. So Why Don't Patients Trust It?" Harvard Business Review, Oct. 30, 2019, Web Page <https://hbr.org/2019/10/ai-can-outperform-doctors-so-why-dont-patients-trust-it> accessed on Aug. 30, 2023 (7 Pages).

"Doctor Ai," DDXRX, Web Page <https://www.ddxrx.com/> accessed on Aug. 30, 2023 (7 Pages).

"Multi-Factor Authentication and Voice Biometrics," Voice Biometrics Group, Feb. 2021, Web Page <https://www.voicebiogroup.com/starting/multi-factor-authentication-and-voice-biometrics.html> accessed on Aug. 30, 2023 (6 Pages).

Wallace, Byron C et al. "Automatically annotating topics in transcripts of patient-provider interactions via machine learning." Medi-

(56) References Cited

OTHER PUBLICATIONS cal decision making : an international journal of the Society for Medical Decision Making vol. 34,4 (2014): 503-12. doi:10.1177/0272989X13514777 (20 Pages).

"Medical Transcription Analysis with Machine Learning—Doctor/Patient Conversation Demo," Amazon Web Services, Jun. 16, 2021, Web Page <https://www.youtube.com/watch?v=f5HVIALG5g4> accessed on Aug. 30, 2023 (2 Pages).

Baxendale, Simran et al., "Performing medical transcription analysis with Amazon Transcribe Medical and Amazon Comprehend Medical," Amazon Web Services, May 8, 2020, Web Page <https://aws.amazon.com/blogs/machine-learning/performing-medical-transcription-analysis-with-amazon-transcribe-medical-and-amazon-comprehend-medical/> accessed on Aug. 30, 2023 (12 Pages).

Sullivan, Todd et al., "Speaker Identification and Geographical Region Prediction in Audio Reviews," Department of Computer Science, Stanford University, 2023 (4 Pages).

"Finding Local Destinations with Siri's Regionally Specific Language Models for Speech Recognition," Apple Machine Learning Research, Aug. 2018, Web Page <https://machinelearning.apple.com/research/regionally-specific-language-models> accessed on Aug. 30, 2023 (9 Pages).

Tyagi, Nemika et al., "Demystifying the Role of Natural Language Processing (NLP) in Smart City Applications: Background, Motivation, Recent Advances, and Future Research Directions." Wireless Personal Communications 130.2 (2023): 857-908. (52 Pages).

Alozie, Emeka, "The AI Surgeon's Assistant: How Generative AI is Revolutionizing the Operating Room," Apr. 20, 2023, Web Page <https://intuitivex.com/tpost/p7bhza9611-the-ai-surgeons-assistant-how-generative> accessed on Aug. 30, 2023 (9 Pages).

Gaitan, Michelle, "Researchers at UTSA use artificial intelligence to improve cancer treatment," University of Texas at San Antonio, Apr. 18, 2023, Web Page <https://www.utsa.edu/today/2023/04/story/researchers-use-artifical-intelligence-to-improve-cancer-treatments.html> accessed on Aug. 30, 2023 (4 Pages).

Bohr, Adam et al., "The rise of artificial intelligence in healthcare applications." Artificial Intelligence in Healthcare (2020): 25-60. doi:10.1016/B978-0-12-818438-7.00002-2 (37 Pages).

"Introducing Healthcare-Specific Large Language Models from John Snow Labs," KDnuggets, Apr. 28, 2023, Web Page <https://www.kdnuggets.com/2023/04/john-snow-introducing-healthcare-specific-large-language-models-john-snow-labs.html> accessed on Aug. 30, 2023 (7 Pages).

\* cited by examiner

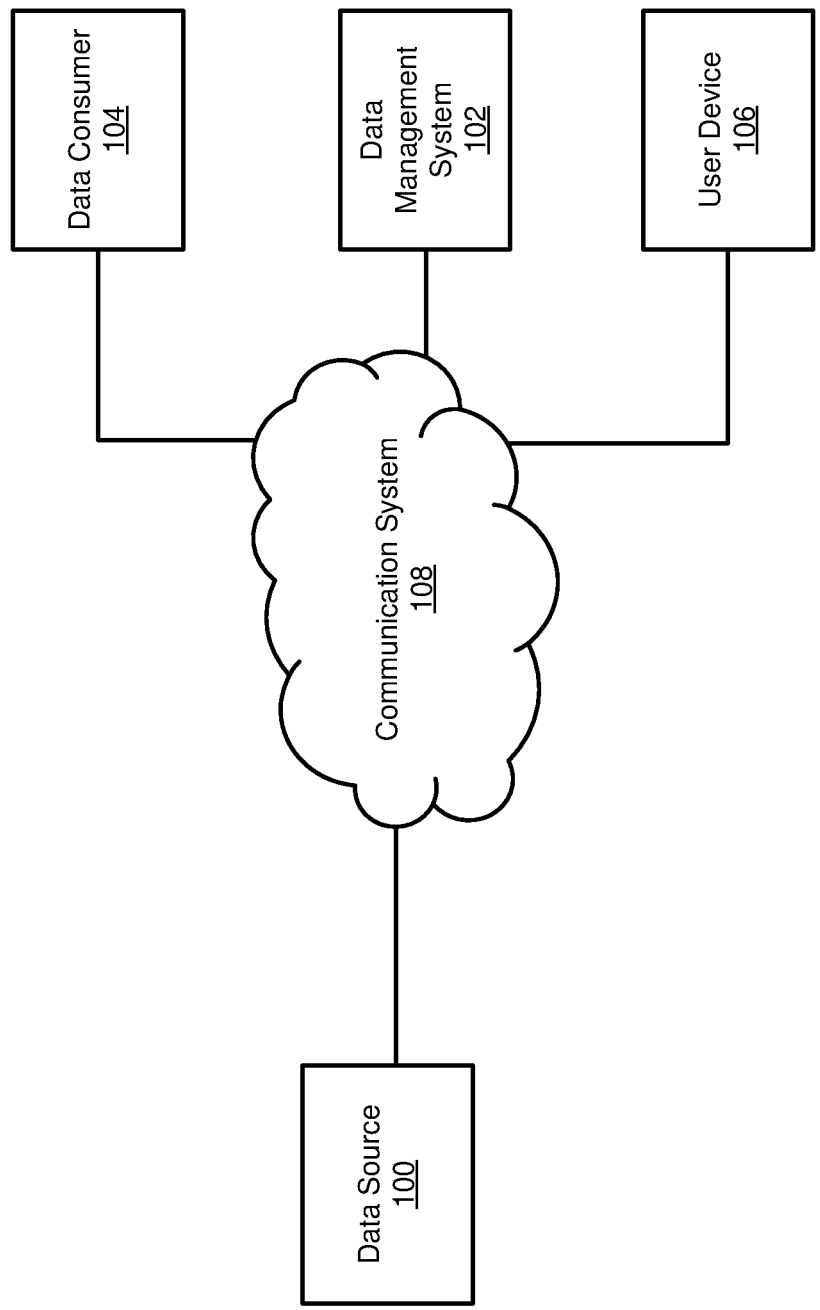

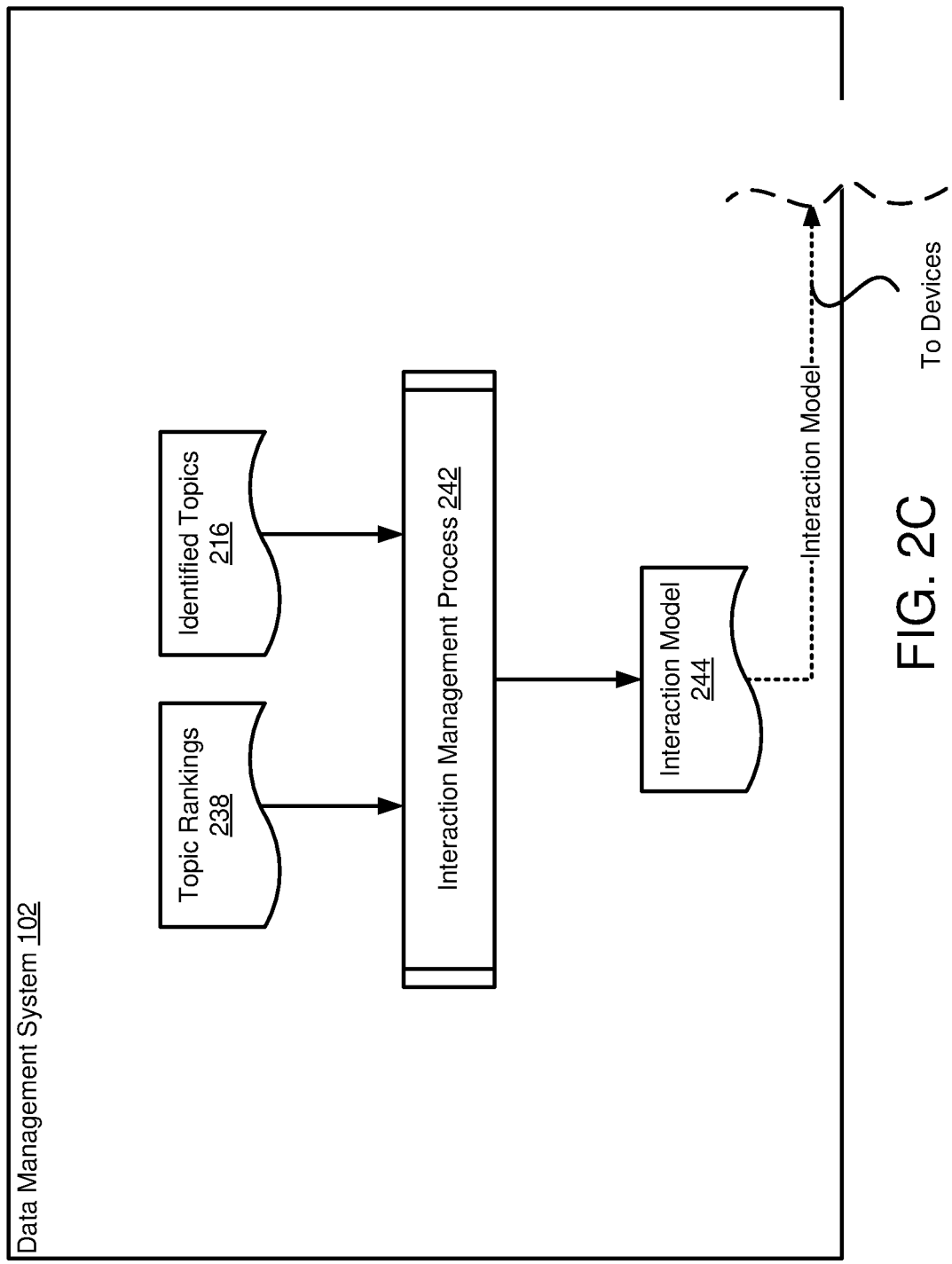

SYSTEM AND METHOD FOR MANAGING USER ACCESSIBILITY BASED ON DATA IN A DATA MANAGEMENT SYSTEM

FIELD

Embodiments disclosed herein relate generally to user accessibility management. More particularly, embodiments disclosed herein relate to systems and methods to manage user accessibility based on data in a data management system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1 shows a block diagram illustrating a system in accordance with an embodiment.

FIGS. 2A-2C show diagrams illustrating data flows in accordance with an embodiment.

DETAILED DESCRIPTION

Figure 2A:
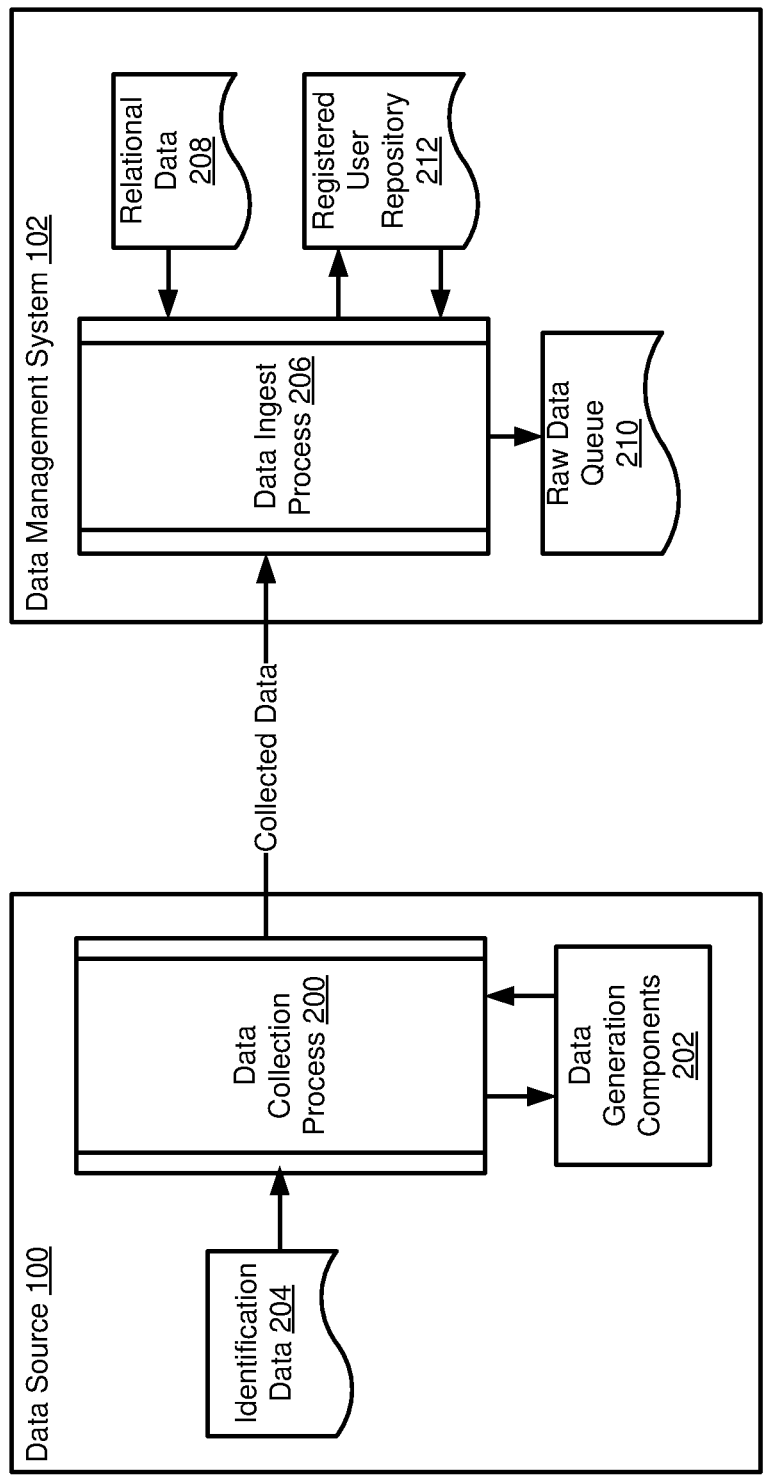

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing user interactions between a user and at least one user device. A user interaction may include how information is communicated between a user and a user device which may be established based on the type of interface of the user device. Some user interfaces may communicate information using different sensory systems of a user. However, some user's ability to interact with user devices may be limited based on an impairment affecting the user.

To manage the user interactions, a data management system may utilize different interaction models with a user on the basis of topics and relevancy of the portions of data for one or more purposes (e.g., topics) with respect to an individual. To identify relevant data, the data management system may analyze data being collected and stored, audio recordings of interactions between the individual and other individuals that provide services, and/or other types of data that may include information identifying relevant content to the individual for which the data is stored.

By identifying relevant content to the individual, the system may establish topics that are relevant to the individual and identify conditions (e.g., impacting a user's ability to interact with a user device) including and/or relating to the topics. The data management system may update the topics relevant to the individual and/or adjust relevancy rankings of the topics as new information regarding the topics is obtained. By proactively updating the relevant topics and relevancy rankings for the topics, the data management system may be more likely to identify the conditions more impactful to the individual for which the data is regarding.

Thus, embodiments disclosed herein may provide an improved system for managing user interactions between a user and at least one user device. The improved user interaction system may obtain an interaction model to deploy to the user device thereby establishing how a user device may communicate information to the user and/or receive user input from the user. Data management system may obtain an interaction model customized to the user based on condition(s) and extent of the condition(s) affecting a user's ability to interact with at least one user device. The data management system may identify the condition(s) and/or extent of the condition(s) affecting the user by discriminating more relevant data from less relevant data based on topics relevant to the user for which the data is regarding. Relevancy ratings of the topics relevant to the individual may be adjusted dynamically as new information is obtained by the system. By doing so, a system in accordance with embodiments disclosed herein may adjust how information is being communicated between a user and a user device based on the relevancy of the data for one or more purposes with respect to the user.

By managing user interactions based on relevancy of the data to the user, the system may automatically and/or semiautomatically manage how data is being communicated between a user device and a user. Thereby, the functionality of the user device (e.g., to communicate information to a user) may be maintained without user input and/or assistance of another individual's input on behalf of the user (e.g., due to a user's inability to submit input via a default interface).

In an embodiment, a method for managing user interactions between a user and at least one user device is disclosed. The method may include obtaining topic classifications and topic rankings for the topic classifications, the topic classifications and the topic rankings being used by a data management system to manage data relevant to the user; performing an interaction management process using the topic classifications and the topic rankings to obtain an interaction model for the user; and deploying the interaction model to the at least one user device, the interaction model defining how the at least one user device communicates information to the user and/or obtains user input from the user.

The topic classifications and the topic rankings may be based at least in part on an audio transcript, the audio transcript may be based on an audio file, and the audio file may include audio data based on at least one conversation between two people.

The topic classifications may include an enumeration of each unique topic of topics discussed during the at least one conversation between the two people captured in the audio transcript; and the two people may include the user for which the data is stored in the data management system, and a second person which provides at least one service to the user.

The topic rankings may indicate a rank ordering of the topic classifications, the rank ordering of the topic classifications may preferentially ranking topic classifications associated with instances of the topics discussed during the at least one conversation between the two people.

Performing the interaction management process may include: identifying an impairment for the user using the topic classifications, the impairment limiting an ability of the user to interact with the at least one user device using a default interface; obtaining an accessibility quantification for the user using the topic rankings, the accessibility quantification indicating an extent to which the user is limited in their ability to interact with at least one user device using the default interface; identifying an at least one accessibility feature of the user device based on the impairment; selecting an extent of change for use of the at least one accessibility feature based on the accessibility quantification; and populating the interaction model at least in part using the at least one accessibility feature and the extent of the change.

Deploying the interaction model may include: establishing, using the interaction model, an interface of the at least one user device for the user that is customized to at least one condition impacting an ability of the user to interact with the at least one user device.

The method may further include: communicating information from the user device to the user via the interface, the interface being a medium to translate the information between two different systems of representation, the two different systems of representation comprising different forms of communicating the information.

Communicating the information to the user may include: providing a portion of data, using the interface, from the at least one user device to the user, the interface being a graphical user interface to communicate the portion of data through a visual interaction with the user.

Communicating the information to the user may further include: selecting a characteristic of characteristics of the graphical user interface based on the topic classifications, the characteristics of the graphical user interface comprising font size, display regions, display icons, color palettes, and/or any other characteristics of the graphical user interface; and adjusting the selected characteristic of the graphical user interface based on the topic rankings to improve the visual interaction between the at least one user device and the user.

Communicating the information to the user may include: providing a portion of data, using the interface, from the at least one user device to the user, the interface being an auditory interface to communicate the portion of data through an auditory interaction with the user.

Communicating the information to the user may further include: selecting a characteristic of characteristics of the auditory interface based on the topic classifications, the characteristics of the auditory interface comprising speech recognition, non-speech audio cues, audio volume, text-to-speech, and/or any other characteristics of the auditory interface; and adjusting the selected characteristic of the auditory interface based on the topic rankings to improve the auditory interaction between the at least one user device and the user.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include data management services, data storage services, data access and control services, database services, and/or any other type of service that may be implemented with a computing device.

The system may include data management system 102. Data management system 102 may provide all, or a portion, of the computer-implemented services. To provide the computer-implemented services, data may be stored in data management system 102. The data stored in data management system 102 may include data usable (i) by an individual for which the data is stored, (ii) by other individuals to assist the individual, and/or (iii) by other individuals for other types of use. For example, the data may include healthcare information for an individual and the data may be usable by other individuals such as healthcare providers to diagnose and/or treat the individual for various health conditions.

The data stored in data management system 102 may be collected from data source 100. While illustrated with respect to a single data source, the system of FIG. 1 may include any number of data sources through which data management system 102 may obtain data. Data source 100 may include hardware and/or software components configured to obtain data, store data, provide data to other entities, and/or to perform any other task to facilitate performance of the computer-implemented services.

For example, an individual's healthcare information may be obtained from a healthcare provider system (e.g., data source 100) for use by the individual and/or other individuals (via associated devices). The data collected from data source 100 may include any quantity, size, and type of data. The data may include, for example, an audio recording (e.g., audio file) of a conversation between an individual and a healthcare provider, digitized results of medical tests, etc.

By storing data in data management system 102, the data may be usable for a variety of purposes. For example, in the healthcare context, the data may be usable for diagnostic purposes, verification purposes (e.g., second opinions), to facilitate studies by third parties that may use the data, etc. While described with respect to the healthcare services context, it will be appreciated that data may be stored in data management system 102 for other purposes and/or with respect to other contexts. For example, the stored data may be relevant for other types of services, uses, etc. without departing from embodiments disclosed herein.

However, access to the data stored in data management system 102 may be limited and/or depend on a user's ability to interact with a user device. In some instances, a user may have an impairment that impacts the user's ability to interact with the user device in order to receive and/or provide communication regarding the data stored in data management system 102. For example, a user may have an auditory impairment (e.g., limited hearing, deaf, etc.) which may affect the user's ability to receive information via in an auditory manner.

As an additional example, a user may have a visual impairment (e.g., nearsighted, farsighted, blind, color blind, etc.) which may affect the user's ability to interact with a graphical user interface operating under default settings (e.g., designed for users without any visual impairments). In these instances, the user may require a setting and/or characteristic (e.g., font size, display icons, color palettes, etc.) of the graphical user interface to be changed to accommodate the visual impairment of the user. These impairments may change dynamically over time.

In general, embodiments disclosed herein may provide methods, systems, and/or devices for managing user interactions between a user and user device(s). To manage the user interactions between the user and the user device(s), data management system 102 may adjust the method in which information is communicated between the user and user device(s) to compensate for any user impairment which may limit the user's ability to interact with the user device(s). For example, data management system 102 may (i) provide information to a user device identifying a type of interface (e.g., medium in which communicates information between two different systems) to implement in order for the user to effectively communicate with the user device, (ii) provide information to a user device identifying a characteristic of an interface (e.g., font size, display icons, color palettes, etc.) to adjust, and/or (iii) perform other types of user interaction management actions which may improve the user's ability to interact with the user device(s).

Data management system 102 may identify the type of interface necessary to effectively communicate information between a user and at least one user device and select a magnitude of change in a characteristic of the identified interface based on an identified impairment of the user and the severity of the impairment. The impairment of the user may affect the user's ability to interact with the user device(s).

Data management system 102 may identify a type of interface (e.g., set of rules through which information may be communicated successfully between two different system representatives) based on a user's impairment to effectively communicate with a user device. For example, various sensory impairments may limit a user's ability to communicate with a user device. Some sensory systems of a user (e.g., visual, auditory, tactile, olfactory, etc.) may be impaired and/or limited due to various reasons (e.g., birth defect, aging, etc.) which may affect the user's ability to communicate and/or receive information using the impaired sensory system. Therefore, data management system 102 may deploy an interaction model instructing the user device how to interact (e.g., which interface to implement) with the user in order to accommodate the user's impairment.

In order to identify an impairment or limitation affecting the user, data management system 102 may analyze the data being collected and stored on behalf of the user, audio recordings of interactions between the user and other individuals that provide services (e.g., a purpose for the data) to the individual, and/or other types of data that may include content relevant to discerning purposes (e.g., topics) that are relevant to the individual for which the data is stored. For example, data management system 102 may analyze an audio recording of a conversation between an individual and a healthcare provider to identify medical conditions impacting the individual. Based on this identification, data management system 102 may establish topics that are relevant to the individual, and adjust the method in which the user device(s) interacts with the user based on the topics (e.g., in this example, diagnosis, treatment, etc. of these medical conditions).

As new information regarding the topics becomes available, the topics and severity ratings (e.g., some topics may be of higher severity) for the topics may be updated. Consequently, the topics for which the interaction method between a user and user device is adjusted may be dynamically updated over time. For example, a user's eyesight may deteriorate over a period of time and as such, the visual interaction (e.g., via graphical user interface) between the user and user device may need to be adjusted to compensate for the increasing visual impairment of the user.

By dynamically updating the topics and severity rankings for the topics over time, embodiments disclosed herein may provide an interaction system that is more likely to adjust the method in which a user device communicates information to a user in order to improve the ability of the user to effectively interact with a user device. The disclosed embodiments may do so in an automated and/or semiautomated fashion thereby to improve the accessibility of the user to interact with a user device based on the data managed by data management system 102.

To provide the above noted functionality, the system of FIG. 1 may include data source 100, data management system 102, data consumer 104, user device 106, and communication system 108. Each of these components is discussed below.

Data source 100 may (i) facilitate collection and transmission of data (e.g., regarding and/or relating to an individual) to data management system 102, (ii) provide information identifying the individual or entity sourcing the data to data management system 102, and/or (iii) otherwise facilitate collection of data by data management system 102. Data source 100 may be include a system operated by a medical provider which may collect, store, and/or provide access to data for a patient or individual, a personal device that collects information about an individual (e.g., cellphone, smart watch, etc.), and/or another type of data collection device. While described with respect to a medical provider, it will be appreciated that data source 100 may provide data related to other purposes without departing from embodiments disclosed herein. Refer to FIG. 2A for additional details regarding obtaining data using data source 100.

Data source 100 may be managed by (i) an individual or a patient for which the data is being collected, (ii) professional individuals that may provide a service for an individual, and/or (iii) other individuals or entities that may provide services for an individual. For example, data source 100 may be implemented using a professional medical device and/or another device operated by a medical provider.

To manage user interactions, data management system 102 may (i) obtain data from data source 100 (ii) for audio data, perform a transcription process to obtain a text transcript of the audio data, (iii) perform an analysis of the text transcript of the data, (iv) based on the analysis of the text transcript, identify topic classifications and topic rankings for the topic classifications, (v) perform an interaction management process to identify an interaction model for the user (e.g., based on topic classifications, topic rankings, and/or other factors), and/or (vi) provide the interaction model to user device(s) to manage interactions between the user device(s) and the user. Similarly, data management system 102 may also provide access to stored data (e.g., to the individual for which the data is being managed and/or to data consumer 104). Refer to FIG. 2C for additional details regarding managing user interactions.

Data management system 102 may be implemented with multiple computing devices. For example, data management system 102 may be implemented with a data center, cloud installation, or other type of computing environment. The computing environment may host a software stack for registering devices, and system for obtaining and managing privately held information.

Data consumer 104 may (i) obtain limited access to selective portions of data stored in data management system 102, (ii) submit requests for access to data stored in data management system 102 by a third party or other individual, (iii) provide information identifying the individual or entity requesting access to the data and/or other types of information upon which decisions to grant access may be based, and/or (iv) once a request for access is granted (e.g., by user device 106), obtain access to data stored in data management system 102 (e.g., data for which access has been granted based on the submitted requests).

User device 106 may facilitate (i) access and control over data stored in data management system 102 by an individual, (ii) designation of portions of data for use by other individuals (e.g., data consumer 104), (iii) implementation of interaction models received from data management system 102 in order to communicate information to a user, and/or (iv) performance of other management operations. User device 106 may be registered with data management system 102. For example, data management system 102 may confirm the identity of user device 106 based on a registration of the device, the registration may indicate that user device 106 is being used by the user or individual.

Figure 3:
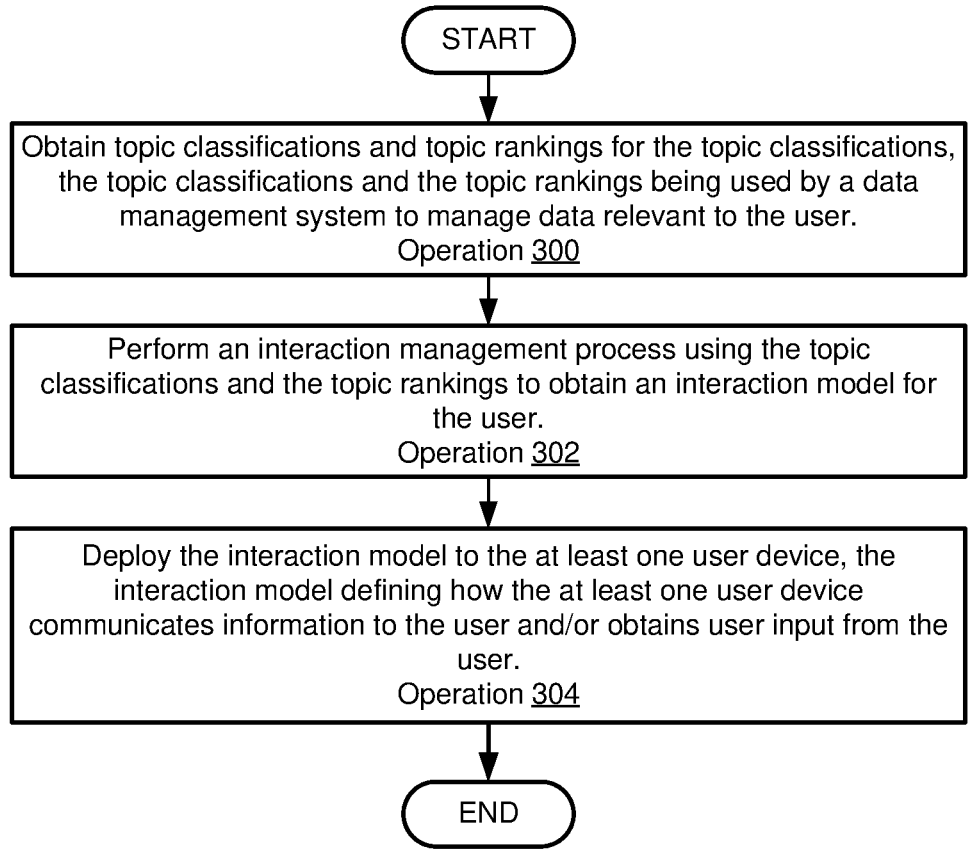
FIG. 3 shows a flow diagram illustrating a method of managing user interactions between a user and at least one user device in accordance with an embodiment.

When providing their functionality, any of data source 100, data management system 102, data consumer 104, and/or user device 106 may perform all, or a portion, of the methods shown in FIG. 3.

Any of (and/or components thereof) data source 100, data management system 102, data consumer 104, and user device 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 108. In an embodiment, communication system 108 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

Figure 2B:
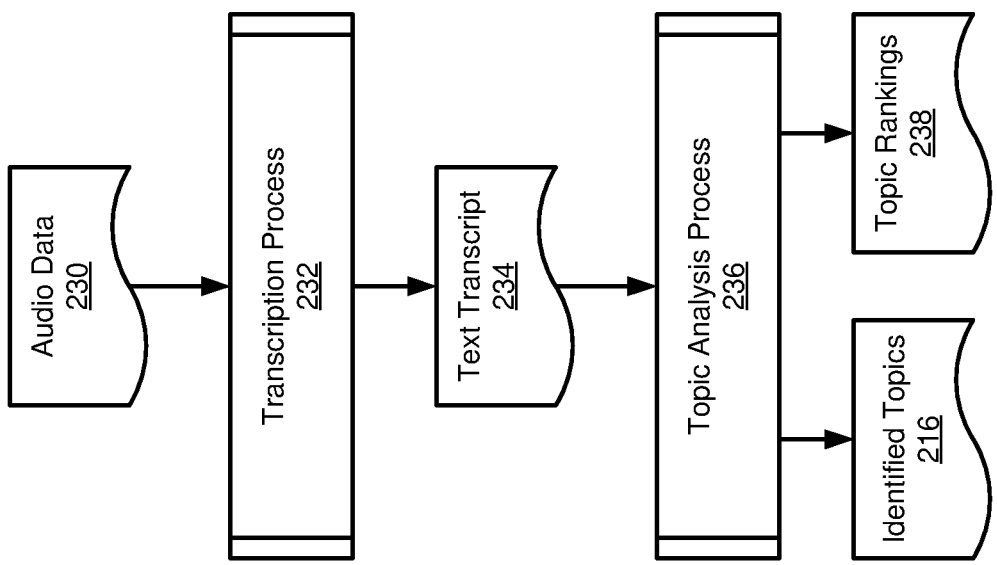

To further clarify embodiments disclosed herein, diagrams illustrating data flows implemented by a system over time in accordance with an embodiment are shown in FIGS. 2A-2C. In FIGS. 2A-2C, a first set of shapes (e.g., 204, 208) is used to represent data structures, a second set of shapes (e.g., 200, 206) is used to represent processes performed using data, and a third set of shapes (e.g., 202) is used to represent data generation components such as hardware components.

Turning to FIG. 2A, a first data flow diagram illustrating data flows, data processing, and/or other operations that may be performed by the system of FIG. 1 in accordance with an embodiment is shown. The data flows, data processing, and/or other operations may be performed when data is obtained from a data source. In FIG. 2A, example flows between data source 100 and data management system 102 are shown. It will be appreciated that similar data flow with respect to any devices (e.g., devices that may collect and transmit data to data management system 102 such as user device 106) and data management system 102 may be present.

To provide computer-implemented services, data management system 102 may obtain, store, and/or otherwise manage data for an individual. Data management system 102 may (i) obtain data from data source 100, and (ii) store some or all of the collected data for future use. To obtain the data, data management system 102 and data sources 100 may cooperate with one another for data collection purposes.

To cooperate with data management system 102 for data collection purposes, data source 100 may perform data collection process 200. During data collection process 200, data may be (i) collected using data generation components 202, and (ii) provided all or a portion of the collected data (and/or derived data that is based at least in part on the collected data) to data management 102. Data generation components 202 may include software components and/or hardware components to collect data.

For example, data generation components 202 may include sensors, generative components, and display components of data source 100. The display components may be used to display prompts to a user of data source 100 (e.g., to instruct a user how to participate in data collection processes). The generative components may be used to generate various stimulations (e.g., optical, audio, etc.) for the user (e.g., so that data may be collected). The sensors may be used to obtain information regarding the user and the impact of the stimulations on the user.

Once collected, the data may be prepared for transmission to data management system. To prepare the collected data for transmission, the data may be enriched with additional information by adding metadata. The metadata may include, for example, (i) information regarding how the data was collected, (ii) information regarding for which entity the data was collected such as a user for which data management system 102 manages data, (iii) collection time, and/or other information that may enhance the collected data.

To add the metadata, data source 100 may store information regarding the user. For example, data source 100 may store identification data 204. Identification data 204 may include information regarding the identity of the individual for which the collected data is regarding/relating to. For example, identifying information such as the individual's name, date of birth, and/or any other identifying information for the individual for which the data is regarding.

Identification data 204 may also include information regarding the identity of the user and/or entity operating data source 100. For example, identifying information such as the user's and/or entity's name, IP address, and/or any other information useful to identify the operator and/or manager of data source 100.

Once enhanced, the collected data and corresponding metadata may be provided to data management system 102. To cooperate with data source 100 for data collection purposes, data management system 102 may perform data ingest process 206.

During data ingest process 206, the collected data obtained from data source 100 may be (i) classified with respect to which user the collected data is associated, (ii) managed in accordance with user-based access controls, and (iii) queued in raw data queue 210 for additional processing. Refer to FIG. 2B for additional details regarding the additional processing that may be performed on collected data.

To classify the data with respect to user, the metadata may specify the user for which the data was collected. The user specified by the metadata may checked against users listed in registered user repository 212. Registered user repository 212 may include information regarding users that received data management services from data management system 102. Thus, when collected data is obtained, it may be verified as being relevant to users using registered user repository 212 (if not relevant, it may be discarded).

To manage the collected data in accordance with access controls, access to the data may be at least partially restricted. The restrictions for access to the collected data may be specified by relational data 208. Relational data may specify restrictions on access to data managed by data management system 102 on behalf of different users. For example, the users may specify limits on the ability of other entities to access data managed by data management system 102 on behalf of the users.

For example, relational data 208 may specify whether and to what extent a data consumer (e.g., 104) may access the data stored by data management system 102 on behalf of a user. The access controls may be granular, thereby allowing a user to control which data consumers are able to access different portions of data. The access controls for a user may be established on a topic by topic basis. Thus, access to data for a given consumer may be given on a topic basis thereby allowing a user to provide a data consumer with access to all, or a portion, of the data managed by data management system that is related to one or more topics. Refer to FIG. 2B for additional information regarding topics.

To prepare the collected data for additional processing, the collected data may be queued in raw data queue 210. Raw data queue 210 may be implemented as a first in first out queue, or other type of queue. Raw data queue 210 may buffer data until it is processed and stored for long term retention.

Turning to FIG. 2B, a second data flow diagram illustrating data flows, data processing, and/or other operations that may be performed by the system of FIG. 1 in accordance with an embodiment is shown. The data flows, data processing, and/or other operations may be performed to identify topics relevant to a user, purpose, and/or another basis.

To obtain identified topics 216, data including clues and/or other information usable to identify topics that are relevant may be collected. For example, audio recordings of interactions (e.g., conversations) between an individual (e.g., a user of the data management system) and other individuals that provide services (e.g., a purpose for the data) to the individual may be obtained. The resulting audio data 230—and/or other types of data that may include content relevant to discern purposes (e.g., topics) relevant to the individual for which the data is being collected and stored—may be used to identify topics relevant to the individual.

For example, audio data 230 may include an audio recording of a conversation between a patient and a medical provider in which the two people discuss diagnosis, treatment, etc. for a particular type of medical condition such as myopia (e.g., nearsightedness). The conversation may be analyzed to identify topics (e.g., medical conditions, medical tests, etc.) that are relevant to the patient.

In order to analyze audio data 230, transcription process 232 may be performed. During transcription process 232, audio data 230 may be transcribed to obtain text transcript 234. Transcription process 232 may be performed using an inference model (not shown), artificial intelligence model (AI model), natural language processing, and/or automated transcription modalities. For example, audio data 230 may be ingested by an inference model through which audio data 230 is analyzed and transcribed into a text format (e.g., text transcript 234).

Once text transcript 234 is obtained, topic analysis process 236 may be performed in order to obtain identified topics 216 and topic rankings 238. Identified topics 216 may, as noted above, indicate topics that are relevant to a user of the data management system, and topic rankings 238 may indicate a rank order of the topics indicated by the identified topics 216. The rank order may be with respect to relevancy of the topics to the user.

During topic analysis process 236, text transcript 234 may be analyzed to (i) identify topics relevant to a user, and (ii) relative importance of each of the topics to the user.

To identify topics relevant to the user, text transcript 234 may be analyzed via (i) automated textual analysis to identify frequency/number of occurrences of difference utterances (e.g., words, phrases, etc.) made during the conversation captured in audio data 230, (ii) inferencing using inference models, (iii) large language model based natural language processing, and/or other text analysis modalities. The resulting output of any of these analyzation techniques may include a list of (i) topics that arose during the conversation captured in audio data 230, (ii) frequencies/counts of the topics, (iii) levels of emphasis on the different topics made by the different participants in the conversation, (iv) participants in the conversation that brought up the topics during the conversation, (v) duration of time during the conversation each topic was the topic of the conversation, (vi) opinion polarity (e.g., positive, neutral, negative, etc.) of each topic identified in the data, and/or other information regarding the topics during the conversation.

Identified topics 216 may be established based on any of the aforementioned information obtained via analysis of text transcript 234. For example, identified topics 216 may include (i) all topics that met a minimum threshold of interest (e.g., brought up above a threshold number of times/met a duration of time requirement as the topic of conversation) during the conversation captured by audio data 230, (ii) a prescribed number of the topics that were of the highest interest, etc.

Topic rankings 238 may be established based on the level of severity for each of identified topics 216 identified based on the conversation captured by audio data 230. For example, topic rankings 238 may rank identified topics 216 based on the polarity associated with each topic, the quantity of utterance, the frequency of utterance, and/or other quantification regarding severity in each of identified topics 216.

For example, an AI model may analyze text data (e.g., text transcript 234) regarding medical diagnosis, treatment, etc. for an individual and identify features (e.g., certain group of text or words) related to nearsightedness (e.g., topic). As such, the AI model may establish the topic of nearsightedness to be relevant to the individual and assign a relevancy value to the topic of nearsightedness (e.g., topic rankings 238). The relevancy value to the topic of nearsightedness, for example, may be assigned by the AI model based on identified polarity (e.g., a degree of positivity or negativity) associated with the topic of nearsightedness.

Identified topics 216 and topic rankings 238 may be stored in a data repository (not shown) of data management system 102.

Over time, identified topics 216 and topics rankings 238 may be updated as new data is collected (e.g., audio data 230). Continuing with the above example, additional audio data that captures a conversation during which a new topic (e.g., such as a new medical condition) is discussed may be obtained and analyzed. Doing so may increase a relevancy value (e.g., topic ranking) for the new topic when compared to the topic of nearsightedness.

As an additional example, additional audio data (e.g., 230) that captures a conversation between a patient and medical provider during which a previously identified topic (e.g., such as nearsightedness) is discussed in a new manner (e.g., change in opinion polarity, frequency of utterances, etc.) may be obtained and analyzed. In this instance, the previous relevancy value (e.g., topic ranking 238) for the topic of nearsightedness may be adjusted (e.g., increased or decreased) based on a change in the level of severity for the topic. For example, an increase in the level of severity for a topic may result in an increased relevancy value (e.g., topic ranking) and a decrease in the level of severity for a topic may result in a decreased relevancy value (e.g., topic ranking).

Once obtained, identified topics 216 and topic rankings 238 may be used to manage user interactions between a user and a user device by obtaining an interaction model customized to accommodate condition(s) impacting an ability of the user to interact with the user device in an automated manner.

Turning to FIG. 2C, a third data flow diagram illustrating data flows, data processing, and/or other operations that may be performed by the system of FIG. 1 in accordance with an embodiment is shown. The data flows, data processing, and/or other operations may be performed to manage user interactions based on data managed by a data management system.

As discussed above, a user's ability to communicate information (e.g., via interaction with a user device) may be limited based on an impairment affecting the user. For example, a user diagnosed with nearsightedness may be unable to interact (and/or successfully interact) with a user device that is operating under default visual settings (e.g., such as regular font size, display icons, etc.) intended for users without any visual impairments.

To manage user interactions, data management system 102 may perform interaction management process 242. During interaction management process 242, any impairments affecting and/or limiting a user's ability to interact (e.g., communicate information) with a user device may be identified in order to obtain interaction model 244. The identified impairment(s) and magnitude of the impairment (e.g., severity of the impairment) may be used to identify a method in which information may be communicated effectively between the user and the user device. The identified method of communication may be included in interaction model 244.

During interaction management process 242, identified topics 216 may be analyzed to identify an impairment affecting and/or limiting an ability of the user to interact with the user device. Identified topics 216 may be analyzed using, for example, inference models (e.g., decision trees, machine learning models, rules based systems, etc.). For example, an inference model may be trained to identify at least one impairment based on the topics relevant to a user (e.g., identified topics 216). In some instances, the impairment(s) may include any limitation affecting any sensory system of a user such as visual, auditory, olfactory (e.g., smell), gustatory (e.g., taste), tactile (e.g., mobility), and/or any other sensory systems.

Once identified, the impairment may be used in order to identify an accessibility feature of a user device. An accessibility feature may include any number of accessibility tools to improve the user's ability to access information from the user device. In some instances, the type of accessibility feature (e.g., relating to visual, auditory, tactile, etc.) may be associated with one or more topics from identified topics 216. For example, the topic of nearsightedness (e.g., obtained via identified topics 216) may be associated with accessibility features relating to improved visual interactions (e.g., high-contrast themes, enlarged font size, enlarged cursors, enlarged display icons, etc.).

In an embodiment, the topic of blindness and/or limited eyesight (e.g., one of the topics from identified topics 216) may be associated with accessibility features relating to auditory interactions (e.g., text-to-speech, machine listening, dialogue systems, etc.).

As an additional example, a topic of deaf and/or hearing loss (e.g., via identified topics 216) may be associated with accessibility features relating to visual interactions (e.g., closed-captioning, increased duration of visual notifications, displaying audio alerts visually, etc.).

During interaction management process 242, topic rankings 238 may be used to obtain an accessibility quantification for the user. The accessibility quantification may indicate an extent to which the user is limited in their ability to interact with a user device using a default interface. For example, each topic of identified topics 216 for a user may be given a corresponding weight using topic rankings 238 (e.g., higher rank topic is given a higher weight). The weighted topics for a user may be summed to obtain an accessibility quantification for the user. The accessibility quantification may be used to select an extent of change for the identified accessibility feature.

Once selected, the identified accessibility feature and extent of the change may be used to populate an interaction model (e.g., 244). Interaction model 244 may define how a device (e.g., user device 106) communicates information to a user and/or obtains user input from the user based on the identified accessibility feature and extent of the change in the accessibility feature.

Interaction model 244 may be provided to one or more devices (e.g., user device 106) in order to establish an interface of the device(s) customized to accommodate at least one condition impacting ability of the user to interact with the device(s). The interface established, based on the interaction model (e.g., 244), may be a medium to translate information between two different systems of representation. For example, an auditory interface may be established by a user device (e.g., 106) in order to translate electrical signals by the computing system of the user device into auditory information receivable by the user.

Turning to FIG. 3, a flow diagram illustrating a method for managing user interactions between a user and at least one user device in accordance with an embodiment is shown. The method may be performed, for example, by any of data source 100, data management system 102, data consumer 104, user device 106, and/or other components of the system shown in FIGS. 1-2C.

Prior to operation 300, a data management system may have obtained data for an individual and stored the data in a data repository within the data management system. The data may have been obtained through various processes such as generation, acquisition from external entity (e.g., medical provider), acquisition from the individual whose data us being stored, and/or by any other method. The data may include data relating to healthcare information for an individual (e.g., medical records) and/or topics discussed during conversations between a first person and a second person. The data may be classified and processed by the data management system based on topics (e.g., types of data) relevant to the individual. To classify and process the data, the data management system may identify topic and topic rankings for the identified topics for an individual.

At operation 300, topic classifications and topic rankings for the topic classifications may be obtained. The topic classifications and the topic rankings may be used by a data management system to manage data relevant to the user. The topic classifications and topic rankings may be obtained by (i) receiving information regarding topic classifications and topic rankings, (ii) generating the topic classifications and topic rankings, and/or (iii) via any other method to obtain topic classifications and topic rankings.

The topic classifications for the data may, as discussed above, be based at least in part on the topics discussed during the conversation between two people. The topic classifications may include an enumeration of each unique topic of topics discussed during the conversation between the two people. For example, an audio recording may include a conversation between a patient and a medical provider discussing a patient's diagnosis, treatment, etc. for blindness. In this example, blindness may be identified as the topic classification in which some portion of data obtained from a data source (e.g., medical provider system) may be associated.

The topic classifications may be a subset of the topics discussed during the conversation. For example, a purpose for identifying a user interaction (and/or limitation thereof) may be placed on the topic classifications. In such cases, the topics from the conversation may be filtered based on the purposes of the impairment of the user to interaction with at least one user device to identify the subset of the topics on which the topic classifications may be based. The purpose may be specified by a user, may be identified via automated means, and/or may be obtained using other methods.

The topic rankings may be based, at least in part, on instances of the topics discussed during a conversation between the two people. For example, a counter of the utterances for the topics, duration of conversation dedicated to each topic, and/or other quantifications may be derived from the conversation. The topic rankings may be based on these quantifications (e.g., more frequently uttered topics may be ranked more highly than less frequently uttered topics).

The topic rankings may also be based, at least in part, on the sentiment of the topics discussed during a conversation between the two people. For example, the polarity of each topic discussed during the conversation, occurrence of a polarity shift in the topics during the conversation, and/or other quantifications may be derived from the conversation. The topic rankings may be based on these quantifications (e.g., topics identified as more negative may be ranked more highly than topics identified as more positive).

At operation 302, an interaction management process may be performed using the topic classifications and the topic rankings to obtain an interaction model for the user. The interaction management process may be performed by (i) identifying an impairment for the user using the topic classifications, (ii) obtaining an accessibility quantification for the user using the topic rankings, (iii) identifying an at least one accessibility feature of the user device based on the impairment, (iv) selecting an extent of change for use of the at least one accessibility feature based on the accessibility quantification, and (v) populating the interaction model at least in part using the at least one accessibility feature and the extent of the change.

At operation 304, the interaction model may be deployed to the at least one user device. The interaction model may be defined how the at least one user device communicates information to the user and/or obtains user input from the user. The interaction model may be deployed by establishing, using the interaction model, an interface of the at least one user device for the user that is customized to at least one condition impacting an ability of the user to interact with the at least one user device and/or by any other methods. Establishing the interface may include providing the interaction model to the at least one user device and the at least one user device to ingest the interaction model in order to build the interface.

For example, an interface that is customized based on at least condition impacting an ability of the user to interact with the at least one user device may be established by providing the interaction model (e.g., information regarding the at least one accessibility feature and the extent of the change) to the at least one user device for ingestion. Providing the interaction model to the at least one user device for ingestion may be performed in a manner specified by the data management system.

The method may include communicating information from the user device to the user via the interface. The interface may be a medium to translate the information between two different systems of representation. For example, the two different systems of representation may communication information in two different forms (e.g., electronic signals via text transcript).

The information may be communicated to the user by (i) providing a portion of the data to the user using the interface, (ii) selecting a characteristic of the interface based on the topic classifications, and/or (iii) adjusting the selected characteristic based on the topic rankings. For example, the interface may be a graphical user interface and a characteristic of the graphical user interface may include font size, display regions, display icons, color palettes, etc. In this instance, selecting the font size as the characteristic of the graphical user interface may be based on the identified topic classification (e.g., an impairment related to eyesight) and adjusting the font size may be based on the topic ranking (e.g., severity of the impairment).

In addition, the information may be communicated to the user via multiple different interfaces. For example, the interface may be an auditory interface in which information may be communicated to the user in an auditory manner. In this instance, communicating information to the user using the auditory interface may be facilitated by (i) selecting a characteristic of characteristics of the auditory interface such as speech recognition, non-speech audio cues, audio volume, text-to-speech, and/or any other characteristics of the auditory interface, (ii) adjusting the selected characteristic of the auditory interface based on the topic rankings to improve the auditory interaction between the user device and the user, and/or (iii) by any other methods.

Using the methods illustrated in FIG. 3, embodiments disclosed herein may facilitate management of user interactions between a user and at least one user device. User interaction management may include obtaining an interaction model to deploy to the user device in order to establish how the user device communicates information to the user and/or obtains user input from the user. The interaction model may be obtained based on an analysis of data managed by a data management system for a user.

Figure 4:
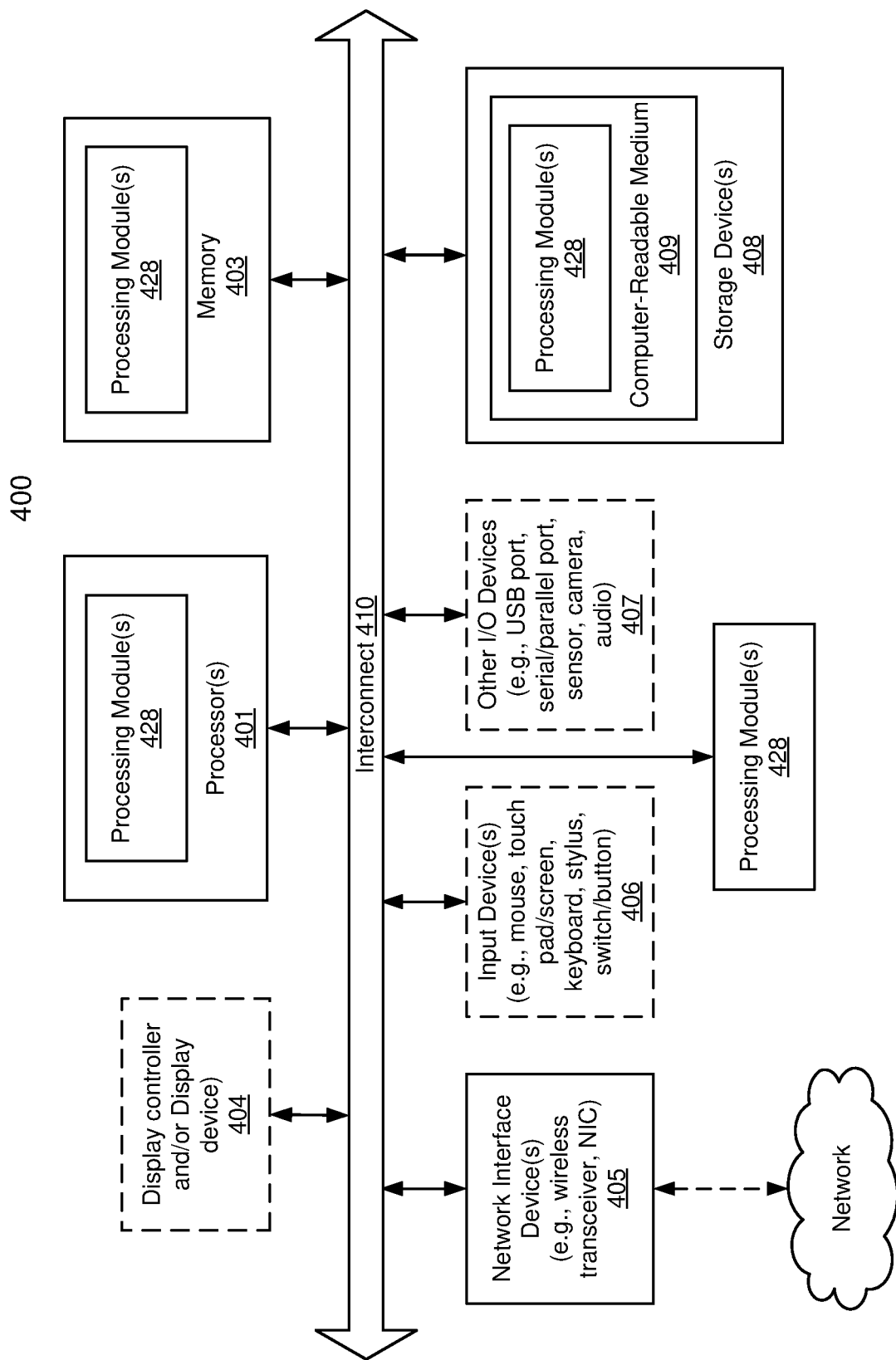
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing user interactions between a user and at least one user device, the method comprising:
obtaining topic classifications and topic rankings for the topic classifications, the topic classifications and the topic rankings being used by a data management system to manage data relevant to the user;
performing an interaction management process to generate an interaction model that is customized solely for the user using:
a sensory impairment of the user that limits an ability of the user to interact with the at least one user device,
the topic classifications, and
the topic rankings, wherein the topic rankings are based at least on a magnitude of the sensory impairment of the user and are used to determine a rank order the topic classifications, the magnitude of the sensory impairment being determined based at least on detection of one or more polarity shifts between positive and negative sentiments towards one or more topics related to the sensory impairment discussed within a conversation between the user and a second individual; and
deploying the interaction model to the at least one user device with instructions for the at least one user device to implement the interaction model, wherein implementation of the interaction model by the at least one user device causes the at least one user device to adjust how the at least one user device communicates information to the user and obtains user input from the user in a manner that improves the ability of the user to interact with the at least one user device in view of the sensory impairment, the adjusting by the at least one user device of how the at least one user device communicates information to the user is based on the magnitude of the sensory impairment.

2. The method of claim 1, wherein the topic classifications and the topic rankings are based at least in part on an audio transcript, the audio transcript being based on an audio file, and the audio file comprising audio data of the conversation.

3. The method of claim 2, wherein the topic classifications comprise an enumeration of each unique topic of topics discussed within the conversation, the topics comprise the one or more topics related to the sensory impairment, and the second individual provides at least one service to the user.

4. The method of claim 1, wherein the performing of the interaction management process comprises:
identifying the sensory impairment for the user using the topic classifications, the sensory impairment limiting the ability of the user to interact with the at least one user device using a default interface;
obtaining an accessibility quantification for the user using the topic rankings, the accessibility quantification indicating an extent to which the user is limited in their ability to interact with the at least one user device using the default interface;
identifying at least one accessibility feature of the at least one user device based on the sensory impairment;
selecting an extent of change for use of the at least one accessibility feature based on the accessibility quantification; and
populating the interaction model at least in part using the at least one accessibility feature and the extent of the change.

5. The method of claim 1, wherein the deploying of the interaction model comprises:
establishing, using the interaction model, an interface of the at least one user device for the user that is customized to at least one condition associated with the sensory impairment that impacts the ability of the user to interact with the at least one user device.

6. The method of claim 5, further comprising:
communicating information from the at least one user device to the user via the interface, the interface being a medium to translate the information between two different systems of representation, the two different systems of representation comprising different forms of communicating the information.

7. The method of claim 6, wherein the communicating of the information to the user comprises:
providing a portion of data, using the interface, from the at least one user device to the user, the interface being a graphical user interface to communicate the portion of data through a visual interaction with the user.

8. The method of claim 7, wherein the communicating of the information to the user further comprises:
selecting a characteristic of characteristics of the graphical user interface based on the topic classifications, the characteristics of the graphical user interface comprising font size, display regions, display icons, color palettes, and/or any other characteristics of the graphical user interface; and
adjusting the selected characteristic of the graphical user interface based on the topic rankings to improve the visual interaction between the at least one user device and the user.

9. The method of claim 6, wherein the communicating of the information to the user comprises:
providing a portion of data, using the interface, from the at least one user device to the user, the interface being an auditory interface to communicate the portion of data through an auditory interaction with the user.

10. The method of claim 9, wherein the communicating of the information to the user further comprises:
selecting a characteristic of characteristics of the auditory interface based on the topic classifications, the characteristics of the auditory interface comprising speech recognition, non-speech audio cues, audio volume, text-to-speech, and/or any other characteristics of the auditory interface; and
adjusting the selected characteristic of the auditory interface based on the topic rankings to improve the auditory interaction between the at least one user device and the user.

11. A non-transitory machine-readable medium having instructions stored therein, which when executed by a processor, cause the processor to perform operations for managing user interactions between a user and at least one user device, the operations comprising:
obtaining topic classifications and topic rankings for the topic classifications, the topic classifications and the topic rankings being used by a data management system to manage data relevant to the user;
performing an interaction management process to generate an interaction model that is customized solely for the user using:
a sensory impairment of the user that limits an ability of the user to interact with the at least one user device, the topic classifications, and
the topic rankings, wherein the topic rankings are based at least on a magnitude of the sensory impairment of the user and are used to determine a rank order the topic classifications, the magnitude of the sensory impairment being determined based at least on detection of one or more polarity shifts between positive and negative sentiments towards one or more topics related to the sensory impairment discussed within a conversation between the user and a second individual; and deploying the interaction model to the at least one user device with instructions for the at least one user device to implement the interaction model, wherein implementation of the interaction model by the at least one user device causes the at least one user device to adjust how the at least one user device communicates information to the user and obtains user input from the user in a manner that improves the ability of the user to interact with the at least one user device in view of the sensory impairment, the adjusting by the at least one user device of how the at least one user device communicates information to the user is based on the magnitude of the sensory impairment.

12. The non-transitory machine-readable medium of claim 11, wherein the topic classifications and the topic rankings are based at least in part on an audio transcript, the audio transcript being based on an audio file, and the audio file comprising audio data of the conversation.

13. The non-transitory machine-readable medium of claim 12, wherein the topic classifications comprise an enumeration of each unique topic of topics discussed within the conversation, the topics comprise the one or more topics related to the sensory impairment, and the second individual provides at least one service to the user.

14. The non-transitory machine-readable medium of claim 11, wherein the performing of the interaction management process comprises:
identifying sensory impairment for the user using the topic classifications, the sensory impairment limiting an ability of the user to interact with the at least one user device using a default interface;
obtaining an accessibility quantification for the user using the topic rankings, the accessibility quantification indicating an extent to which the user is limited in their ability to interact with the at least one user device using the default interface;
identifying at least one accessibility feature of the at least one user device based on the sensory impairment;
selecting an extent of change for use of the at least one accessibility feature based on the accessibility quantification; and
populating the interaction model at least in part using the at least one accessibility feature and the extent of the change.

15. A data processing system, comprising:
a processor; and
a memory coupled to the processor to store instructions, which when executed by the processor, cause the processor to perform operations for managing user interactions between a user and at least one user device, the operations comprising:
obtaining topic classifications and topic rankings for the topic classifications, the topic classifications and the topic rankings being used by a data management system to manage data relevant to the user;
performing an interaction management process to generate an interaction model that is customized solely for the user using:
a sensory impairment of the user that limits an ability of the user to interact with the at least one user device,
the topic classifications, and
the topic rankings, wherein the topic rankings are based at least on a magnitude of the sensory impairment of the user and are used to determine a rank order the topic classifications, the magnitude of the sensory impairment being determined based at least on detection of one or more polarity shifts between positive and negative sentiments towards one or more topics related to the sensory impairment discussed within a conversation between the user and a second individual; and
deploying the interaction model to the at least one user device with instructions for the at least one user device to implement the interaction model, wherein implementation of the interaction model by the at least one user device causes the at least one user device to adjust how the at least one user device communicates information to the user and obtains user input from the user in a manner that improves the ability of the user to interact with the at least one user device in view of the sensory impairment, the adjusting by the at least one user device of how the at least one user device communicates information to the user is based on the magnitude of the sensory impairment.

16. The data processing system of claim 15, wherein the topic classifications and the topic rankings are based at least in part on an audio transcript, the audio transcript being based on an audio file, and the audio file comprising audio data of the conversation.

17. The data processing system of claim 16, wherein the topic classifications comprise an enumeration of each unique topic of topics discussed within the conversation, the topics comprise the one or more topics related to the sensory impairment, and the second individual provides at least one service to the user.

18. The method of claim 1, wherein the performing of the interaction management process comprises, at least, using only the topic classifications to automatically identify the sensory impairment of the user without direct input of the sensory impairment and information related to the sensory impairment by the user and without direct input of the sensory impairment and the information related to the sensory impairment by another individual on behalf of the user.

19. The non-transitory machine-readable medium of claim 11, wherein the deploying of the interaction model comprises:
establishing, using the interaction model, an interface of the at least one user device for the user that is customized to at least one condition associated with the sensory impairment that impacts the ability of the user to interact with the at least one user device.

20. The data processing system of claim 15, wherein the deploying of the interaction model comprises:
establishing, using the interaction model, an interface of the at least one user device for the user that is customized to at least one condition associated with the sensory impairment that impacts the ability of the user to interact with the at least one user device.

* * * * *